(12) United States Patent
Herndon et al.

(10) Patent No.: US 6,444,076 B1
(45) Date of Patent: Sep. 3, 2002

(54) OPTICAL DEVICES AND THEIR METHOD OF ASSEMBLY

(75) Inventors: Reba S. Herndon, Horseheads, NY (US); Ronald E. Johnson, Tioga, PA (US); Joshua U. Otaigbe, Ames, IA (US); Joy C. Wu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/446,159

(22) PCT Filed: Jun. 16, 1998

(86) PCT No.: PCT/US98/12607
§ 371 (c)(1),
(2), (4) Date: Dec. 16, 1999

(87) PCT Pub. No.: WO99/00246
PCT Pub. Date: Jan. 7, 1999

Related U.S. Application Data

(60) Provisional application No. 60/050,811, filed on Jun. 26, 1997.

(51) Int. Cl.[7] .......................... B32B 7/06; B32B 31/18; B32B 33/00
(52) U.S. Cl. .................. 156/249; 156/247; 156/248; 156/256; 156/263; 428/40.1; 359/282
(58) Field of Search .................... 156/99, 106, 247, 156/248, 249, 289, 256, 263; 428/40.1, 64.6, 65.1; 359/281, 282

(56) References Cited

U.S. PATENT DOCUMENTS

| 3,775,226 A | 11/1973 | Windorf ............ 151/4 |
| 3,899,621 A | 8/1975 | Willdorf ............ 428/216 |
| 3,993,815 A * | 11/1976 | Douek et al. |
| 4,025,688 A * | 5/1977 | Nagy et al. |
| 4,075,386 A | 2/1978 | Willdorf ............ 428/216 |
| 4,268,127 A * | 5/1981 | Oshima et al. |
| 4,486,213 A * | 12/1984 | Lentz et al. |
| 4,939,011 A | 7/1990 | Takahashi et al. ............ 428/64 |
| 5,268,228 A * | 12/1993 | Orr |
| 5,312,714 A | 5/1994 | Ogawa ............ 430/273 |
| 5,341,235 A * | 8/1994 | Watanabe et al. |
| 5,345,329 A * | 9/1994 | Shirai et al. |
| 5,375,012 A * | 12/1994 | Borrelli et al. |
| 5,452,122 A * | 9/1995 | Tsuneda et al. |
| 5,515,469 A * | 5/1996 | Zarem et al. |
| 5,592,288 A * | 1/1997 | Sampica et al. |
| 5,731,050 A * | 3/1998 | Kotsubo et al. |
| 5,795,650 A * | 8/1998 | Watanabe et al. |
| 5,808,793 A * | 9/1998 | Chang et al. |
| 5,886,799 A * | 3/1999 | Molteni et al. |
| 5,999,315 A * | 12/1999 | Fukano et al. |
| 6,020,408 A * | 2/2000 | Suzuki et al. |
| 6,074,729 A * | 6/2000 | Watanabe et al. |
| 6,163,404 A * | 12/2000 | Shiono et al. |
| 6,231,962 B1 * | 5/2001 | Bries et al. |
| 6,275,336 B1 * | 8/2001 | Yoshikawa et al. |
| 2001/0036010 A1 * | 11/2001 | Watanabe et al. |

FOREIGN PATENT DOCUMENTS

| EP | 0 751 410 | * | 1/1997 |
| JP | 2-64503 | * | 3/1990 |
| JP | 3-171029 | * | 7/1991 |

* cited by examiner

Primary Examiner—Curtis Mayes
(74) Attorney, Agent, or Firm—Anca C. Gheorghiu

(57) ABSTRACT

The present invention relates to a method of adhering an optically transmissive substrate to a compatible substrate such as plastic or glass and the resulting optical elements. A pressure sensitive adhesive layer, which is optically transmissive and is pre-applied to the optically transmissive substrate, eliminates many handling problems associated with liquid adhesive. Particularly preferred optical elements in accordance with the present invention are optical memory products and optical isolators with dichroic polarizers.

25 Claims, 3 Drawing Sheets

US 6,444,076 B1

OPTICAL DEVICES AND THEIR METHOD OF ASSEMBLY

This application claims the benefit of provisional application 60/050,811 filed on Jun. 26, 1997.

FIELD OF THE INVENTION

The present invention relates to optical devices and their method of assembly.

BACKGROUND OF THE INVENTION

Substrates used to construct optical devices must have a low density of imperfections which could block light transmission. When substrates are joined together, care must be taken to avoid surface imperfections that would scatter the light or cause irregularities such that the light transmission would be impeded.

In one method known in the art, substrates are carefully lapped to a flat surface. They are then heated to their softening temperatures, fused together, and cooled to ambient temperature. Because of the small difference in the coefficients of thermal expansion of the substrates used to make the optical devices and the large temperature difference between the fusing temperature and ambient temperature, thermal strains arise at the interface of the substrate upon cooling. As a result, a rippled surface pattern forms at the interface. This rippling effect causes excessive attenuation of light, reducing the efficiency of the optical device.

Adhesives which are conventionally used in bonding optical disk substrates include solvent-type adhesives, heat activatable adhesives, and two-component condensation-type cold curable silicone rubber-based adhesives. Solvent-type adhesives erode both the substrates themselves and the reflective films. They are also unsuitable for mass production, because the substrates have to be held stationary under uniform pressure for a long period of time until the adhesives are completely cured.

Heat activatable adhesives have the advantage of solidifying in a short period of time after activation. However, the heat applied during activation deforms the substrate. In optical disks, this prevents uniform rotation and, as a result, inexact reproduction of stored information.

Liquid adhesives produce irregularities which cause the bonded layers to deviate from optimum thickness. In optical disks, unless the thickness of the layers is maintained, the flatness of the signal recording layer is deteriorated. This makes it difficult to write and/or read data signals. When a substrate is bonded to another substrate with a liquid adhesive, it is difficult to avoid exudation. In other words, excess adhesive material is displaced and collects on the exterior of the composite article. The exudate can interfere with optical transmission or the packaging of the composite.

Numerous products are made which require the attachment of an optically transmissive substrate to another substrate material such as plastic or glass. Such products include optical memory devices and optical isolators. Optical memory products include optical disks, laser disks, and optical memories. Video disks or compact disks are designed for read-only capability. Information is retrieved by laser light. Optical memories are capable of both information recording and playback or erasure.

The latest version of the optical disk, a digital versatile disk has two layers of data pits. An upper surface is coated with a partially reflective, partially transmissive layer. The reflectivity of the upper layer is sufficient to enable a laser beam to read the pits in the upper substrate. The transmissivity of the upper layer allows the laser beam to focus on and read pits in the second layer. Accordingly, these disks can store more information than conventional disks. In order to function properly, an adhesive of superior quality is needed to bond the two substrates together. The thickness of the bond must be uniform to prevent distortion of focused readout spots.

Thus, there exists a need for a reliable and efficient method of bonding substrates together for use in critical optical applications such as optical memory products and optical isolators. The present invention is directed toward fulfilling this need.

SUMMARY OF THE INVENTION

The present invention relates to a method of forming an optically transmissive substrate by providing a pressure sensitive adhesive sheet which is optically transmissive and has release liners on both sides, removing a release liner from one side of the pressure sensitive adhesive sheet, and applying the exposed side of the pressure sensitive adhesive sheet to one side of the optically transmissive substrate.

Another aspect of the present invention is the optically transmissive substrate with a preapplied adhesive layer having an optically transmissive substrate, a release layer, and a pressure sensitive adhesive sheet which is optically transmissive and is secured to and positioned between the optically transmissive substrate and the release liner.

A further embodiment of the present invention is an optical element having an optically transmissive substrate, a compatible substrate, and a pressure sensitive adhesive sheet which is optically transmissive and is secured to and positioned between the optically transmissive substrate and the compatible substrate.

Yet another embodiment of the present invention is a method of forming an optical isolator by providing a Faraday rotator and first and second pressure sensitive adhesive sheets which are optically transmissive and have release liners on opposed sides of the sheets. A first release liner is removed from a first side of each of the pressure sensitive adhesive sheets. The first side of the first pressure sensitive adhesive sheet is applied to a side of a first polarizer. The first side of the second pressure sensitive adhesive sheet is applied to a side of a second polarizer. The second release liner is removed from each of the adhesive sheets. The second side of the first adhesive sheet is applied to a first end of the Faraday rotator, while the second side of the second adhesive sheet is applied to a second end of the Faraday rotator.

Another aspect of the present invention is an optical isolator having a Faraday rotator, two polarizers, and two adhesive sheets each which is bound on one side to one of the polarizers and on the other side to one end of the Faraday rotator.

DETAILED DESCRIPTION OF THE INVENTION

Figure 1:
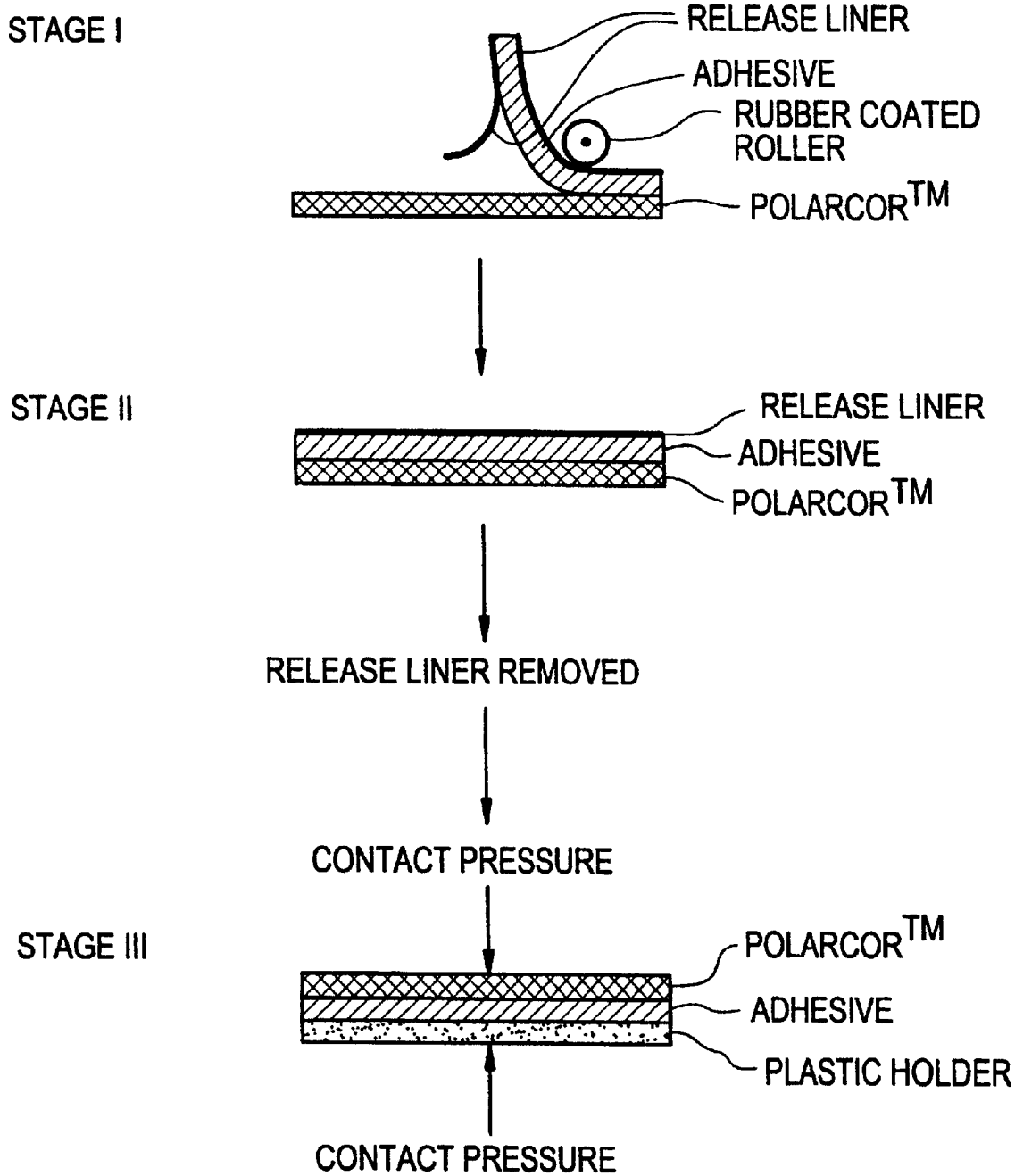
FIG. 1 shows a method for bonding an optically transmissive substrate to a compatible substrate with a pressure sensitive adhesive sheet in accordance with the present invention.

The present invention provides a method of forming an optically transmissive substrate with a preapplied adhesive layer. A pressure sensitive adhesive sheet is provided having a first and second release liner on opposed first and second sides of the adhesive sheet. The release liner is removed from the first side of the adhesive liner. The first side of the adhesive sheet is then applied, e.g., with a rubber coated roller, to one side of an optically transmissive substrate. As shown in FIG. 1 (and as discussed in more detail below), an example of the optically transmissive substrate is a polarizer, such as POLARCOR™ polarizers, Corning, Inc.

The optically transmissive substrate with a preapplied adhesive layer may be diced to the size and shape necessary for the optical product in which it will be incorporated prior to removal of the second release layer.

In a preferred embodiment of the present invention, the optically transmissive substrate is a polarizer, preferably a dichroic silver halide glass polarizer.

U.S. Pat. No. 4,304,584 to Borrelli, which is hereby incorporated by reference, describes the production of glasses exhibiting polarizing properties, i.e., glasses displaying dichroic ratios up to 40 and higher, from two types of silver-containing glasses: (1) phase separable glasses and (2) glasses demonstrating photochromic behavior because of the presence of particles of a silver halide such as AgCl, AgBr, and AgI. The method for preparing the polarizing glasses contemplates two fundamental steps: (a) elongating the base glass under stress to become elongated and aligned in the direction of the stress, and (b) heat treating the elongated glass in a reducing environment at a temperature below the annealing point of the glasses, but above about 300° C. Suitable elongation methods include drawing, extruding, redrawing, rolling, or stretching at temperatures between the annealing point and softening point of the glasses to form glass phases in the phase separable glasses or the silver halide particles in the photochromic glasses. Heat treating is carried out under conditions effective to reduce at least a portion of the silver ions in the glass to metallic silver which is deposited in at least one of the elongated glass phases and/or along the phase boundaries of the elongated glass phases and/or upon the elongated silver halide particles. Preferably, heat treatment is carried out at a temperature between about 375°–450° C. in a hydrogen atmosphere. As a result, polarization was discerned in the visible and near infrared portions of the radiation spectrum.

In the case of phase separable, non-photochromic glasses, the operable compositions are in the alkali metal aluminoborosilicate field. Thus, suitable glasses will commonly contain, in weight percent, about 5–12% alkali metal oxide, 20–35% $B_2O_3$, 1–15% $Al_2O_3$, and the remainder $SiO_2$. However, where $Al_2O_3$ is included in amounts in excess of 5%, a specific phase separation agent such as CdO and/or F must be present at a level of at least 1%.

The base composition of an operable photochromic glass is essentially immaterial so long as AgCl and/or AgBr and/or AgI constitute the photochromic agents, although large amounts, viz., >10% by weight total, of PbO and/or other readily-reducible metal oxides will be avoided.

In addition to silver halide, polarizing glasses may be made with a copper or cadmium halide crystal phase. Glass polarizers, produced from silver halide-containing glasses as just described, have enjoyed commercial success in applications employing radiation in the infrared portion of the spectrum. However, the parallel and perpendicular absorption curves reverse in magnitude and cross over in the visible wavelength region at about 480 nm. This has prevented the silver halide glasses from being considered for use as a visible polarizer, that is, for applications that require polarization in the same direction across the entire visible wavelength region of the spectrum. As used in this application, the term "visible polarizer" means a polarizer that provides effective polarization of radiation across the entire visible wavelength region of the spectrum. This is essentially the wavelength range of 400–700 nm.

U.S. Pat. No. 3,325,299 to Araujo, which is hereby incorporated by reference, discloses phototropic glasses in which copper and/or cadmium halide crystals are precipitated to impart photochromic behavior. The disclosed glasses have $R_2O$—$Al_2O_3$—$B_2O_3$—$SiO_2$ base compositions. These oxides total at least 85% of the glass composition. Copper and/or cadmium oxides, together with sufficient chlorine, bromine, and/or iodine to react stoichiometrically with at least 0.3% copper and/or cadmium, are added to the base glass composition.

U.S. Pat. No. 5,281,562 to Araujo et al., which is hereby incorporated by reference, is directed to a family of glasses which also contain a cuprous and/or cadmium halide crystal phase, and which are strongly absorbing in the ultraviolet region of the radiation spectrum. They have a sharp spectral cut-off of shorter wavelengths at about 400 nm. However, they are non-photochromic and may be essentially colorless.

Japanese Published Application S.N. 4-279,337, which is hereby incorporated by reference, discloses glasses that may be a silicate, a borate, or a borosilicate, and that may have copper halide crystals formed within the glass. The application further discloses that such glasses may be rendered polarizing in the infrared spectral region for telecommunication purposes. This is accomplished in the same manner as in the silver halide crystal-containing glasses noted above. That is, the glass is stretched to elongate the crystals and fired in hydrogen to at least partially reduce the copper halide to metallic copper.

U.S. Pat. No. 5,517,356 to Araujo, which is hereby incorporated by reference, provides a glass polarizer that is effective throughout the entire visible wavelength portion of the spectrum. The glass polarizer has a sharp cutoff in transmission at about 400 nm, which removes harmful ultraviolet rays. This is of particular value in LCD displays to protect the color filter. The glass having an $R_2O$—$Al_2O_3$—$B_2O_3$—$SiO_2$ base composition, a precipitated crystal phase consisting of a halide selected from the group consisting of cuprous, cadmium and mixed cuprous-cadmium halides, the volume fraction of the crystals being greater than 0.003, the crystals in the crystal phase being elongated and oriented, and at least a portion of the crystals near the surface of the article being at least partially reduced to metallic copper. As a result, the glass exhibits permanent dichroic behavior and has an average polarization efficiency across the entire 400–700 nm wavelength range of at least 0.80.

In a preferred embodiment of the invention, the pressure sensitive adhesive when applied to the optically transmissive substrate has a nominal thickness of 10±5 microns.

In a further preferred embodiment of the invention, the pressure sensitive adhesive will transmit at least 80% of light at a wavelength of 785±20 nanometers.

The compositions which are useful as pressure sensitive adhesives must provide the required adhesive strength, be optically transmissive, and can be formed into sheets of uniform dimension and composition. Pressure sensitive adhesives are preferably silicone or acrylic based.

Pressure-sensitive adhesives are characterized by their tack. Tack is the adhesive property related to bond formation. It allows the adhesive to form a bond with the surface of another material upon brief corract under light pressure. The adhesive must have sufficient tack and durability to maintain the structure of the optical device.

In a preferred embodiment of the invention, the pressure sensitive adhesive is an acrylic based adhesive.

Pressure-sensitive acrylic adhesives are formed from acrylic esters which yield polymers of low glass transition temperatures and can be copolymerized with acrylic acids and other functional monomers. Alkyl acrylates and methacrylates of 4–17 carbon atoms are commonly used monomers for pressure-sensitive adhesives. The most commonly used monomers are 2-ethylhexyl acrylate, butyl acrylate, ethyl acrylate, and acrylic acid. Non-acrylic monomers such as vinyl acetate are used frequently to modify polymer properties or decrease the costs of raw materials.

The monomer mixture can be polymerized by various techniques, with photoinitiated bulk polymerization being preferred. An initiator is preferably added to aid in polymerization of the monomers. The type of initiator used depends on the polymerization process. Photoinitiators which are useful for polymerizing the acrylate monomers include benzoin ethers such as benzoin methyl ether or benzoin isopropyl ether, substituted benzoin ethers such as 2-methyl-2-hydroxylpropiophenone, aromatic sulfonyl chlorides such as 2-naphthalenesulfonyl chloride, and photoactive oxides such as 1-phenyl-1,2-propanedione-2-(o-ethoxycarbonyl)oxide. An example of a commercially available photoinitiator is Irgacure TM 651 available from Ciba-Geigy Corporation, having the formula 2,2-dimethoxy-1,2-diphenylethane-1-one. Generally, the photoinitiator is present in an amount of about 0.005 to 1 weight percent based on the weight of the monomers. Examples of suitable thermal initiators include AIBN and peroxides.

The mixture of the polymerizable monomers may also contain a crosslinking agent, or a combination of crosslinking agents, to increase the shear strength of the adhesive. Useful crosslinking agents include substituted triazines such as 2,4,-bis(trichloromethyl)-6-(4-methoxy phenyl)-s-triazine, 2,4-bis(trichloromethyl)-6-(3,4-dimethoxyphenyl)-s-triazine, and the chromophore-substituted halo-s-triazines disclosed in U.S. Pat. Nos. 4,329,384 and 4,330,590 (Vesley, incorporated herein by reference. Other useful crosslinking agents include multifunctional alkyl acrylate monomers such as trimetholpropane triacrylate, pentaerythritol tetraacrylate, 1,2 ethylene glycol diacrylate, 1,4 butanediol diacrylate, 1,6 hexanediol diacrylate, and 1,12 dodecanol diacrylate. Various other crosslinking agents with different molecular weights between (meth)acrylate functionality would also be useful. Generally, the crosslinker is present in an amount of about 0.005 to 1 weight percent based on the combined weight of the monomers.

The adhesive compositions of the present invention are easily coated on suitable flexible release liners, by conventional coating techniques to produce coated adhesive sheet materials. The release liner may be any of the commercially available paper and film liners which have been treated to provide a release surface (such as a surface coating of an aliphatic fluorochemical or silicone) having acceptable handling characteristics (such as limited transfer of adhesive to the liner upon separation therefrom).

If one liner used differential release required. The back side must be very high release so the adhesive does not transfer to it. If two liners employed the adhesive does not contact the back side, but differential release still needed between the two front sides of the liners so it stays only on one upon removal of the first liner. In all cases, low residue deft on the liner is desired after removal.

The compatible substrates of optical memory products conventionally have been constituted by a disk shape base material layer and a synthetic recording layer. The base layer can be formed of a synthetic resin, such as polycarbonate, acrylic resin, polystyrene or polystyrene co-polymer, polyethersulfone, and fluoroplastics, or a glass. The synthetic recording layer can be formed of, for example, a magnetic material. Recently, optical memory products have been produced using glass, especially polarizers having various configurations. Optically transmissive substrates include those substrates which are transmissive for electromagnetic radiation in the ultra-violet, visual, and infrared ranges.

The resulting optically transmissive substrate with a pre-applied adhesive layer has an optically transmissive substrate, a release layer, and a pressure sensitive adhesive sheet which is optically transmissive and is secured to and positioned between the optically transmissive substrate and the release liner. The material can be stored for later use and, when needed, can be readily incorporated into optical products.

The present invention also provides an optically transmissive substrate adhered to a compatible substrate. A pressure sensitive adhesive sheet which is optically transmissive is secured to and positioned between an optically transmissive substrate and a compatible substrate.

An optical isolator is a device used to create an optical light valve which allows light to travel in one direction, but not in the reverse direction. Isolators are used in controlling certain types of light and their functional applications. For example, they are employed along with lasers in their various operations and applications to prevent undesired reflection of laser light back into the laser (i.e., "feedback"). Such feedback can cause destabilization, parasitic oscillations, optical damage, and other significant problems if left uncontrolled.

Optical isolators can incorporate a structure referred to as a "Faraday rotator" to manage and control the behavior of light. A Faraday rotator's operation and use is based upon the "Faraday effect," a term that refers to the rotation of the plane of polarization of light propagating through a medium in the presence of an externally applied magnetic field. The angle which the polarized light is rotated is proportional to the distance that the light travels through the medium, the magnetic field strength along the optical axis, and to a characteristic of the medium referred to as the Verdet constant of the medium.

The general structure of an optical isolator includes a Faraday rotator flanked by two polarizers. The polarizers are usually orientated at 45 degrees with respect to one another, and the Faraday rotator is typically selected to give a 45 degree rotation of its own. In turn, the Faraday rotator generally consists of a Faraday medium material (often referred to as an "optical rod" in visible and near-IR applications) placed within a structure of magnets that are intended to produce the desired magnetic field. In many conventional rotators, the magnets are generally cylindrical with a circular aperture that contains the optical rod. In one common embodiment, the cylindrical magnet assembly is formed of a central magnet flanked by two smaller magnets in the opposite pole-to-pole relationship commonly used to try to produce a high magnetic field along the Faraday medium.

The present invention provides a method of forming an optical isolator. A Faraday rotator and a pressure sensitive adhesive sheet which is optically transmissive and has release liners on both sides are provided. A release liner is removed from one side of the pressure sensitive adhesive sheet. The exposed side of the pressure sensitive adhesive sheet is then applied to one side of a first polarizer. A release liner is removed from one side of the second pressure sensitive adhesive sheet, and the exposed side of the second pressure sensitive adhesive sheet is applied to one side of a second polarizer. The second release liner is removed from each of the adhesive sheets. The first polarizer is applied to one end of the Faraday rotator, and the second polarizer is applied to the second end of the Faraday rotator. Preferentially, the second polarizer is applied so that the two polarizers extend in parallel planes and are rotationally orientated at an angle of 45 degrees relative to one another.

The present invention also relates to the resulting optical isolator having a Faraday rotator, two polarizers, and two adhesive sheets each which is bound on one side to one of the polarizers and, on the other side, to one end of the Faraday rotator.

EXAMPLES

Example 1
Bonding POLARCOR™ to a Plastic Holder

Two acrylic based adhesives, DEV 8154 and IP 2100, supplied by Adhesives Research, Inc., Glen Rock, Pa., and Macta, Stow, Ohio, respectively, were tested. The unsupported pressure sensitive adhesive was applied to one side of a silver halide, dichroic polarizer, sold under the trademark POLARCOR™ supplied by Corning Inc., Corning, N.Y., with the adhesives using a hand-held rubber-coated roller while simultaneously pulling off the one release liner (as shown in FIG. 1). The POLARCOR™ polarizer with the adhesive and the second liner in place was diced using a cutting tool equipped with a diamond saw. The diced parts were then glued onto the plastic holder by removing the second release liner and applying contact pressure to the POLARCOR™ polarizer and plastic holder. See FIG. 1.

The resulting product was diced into smaller pieces with a water jet.

Example 2
Durability Testing of Bonded Product

Figure 2:
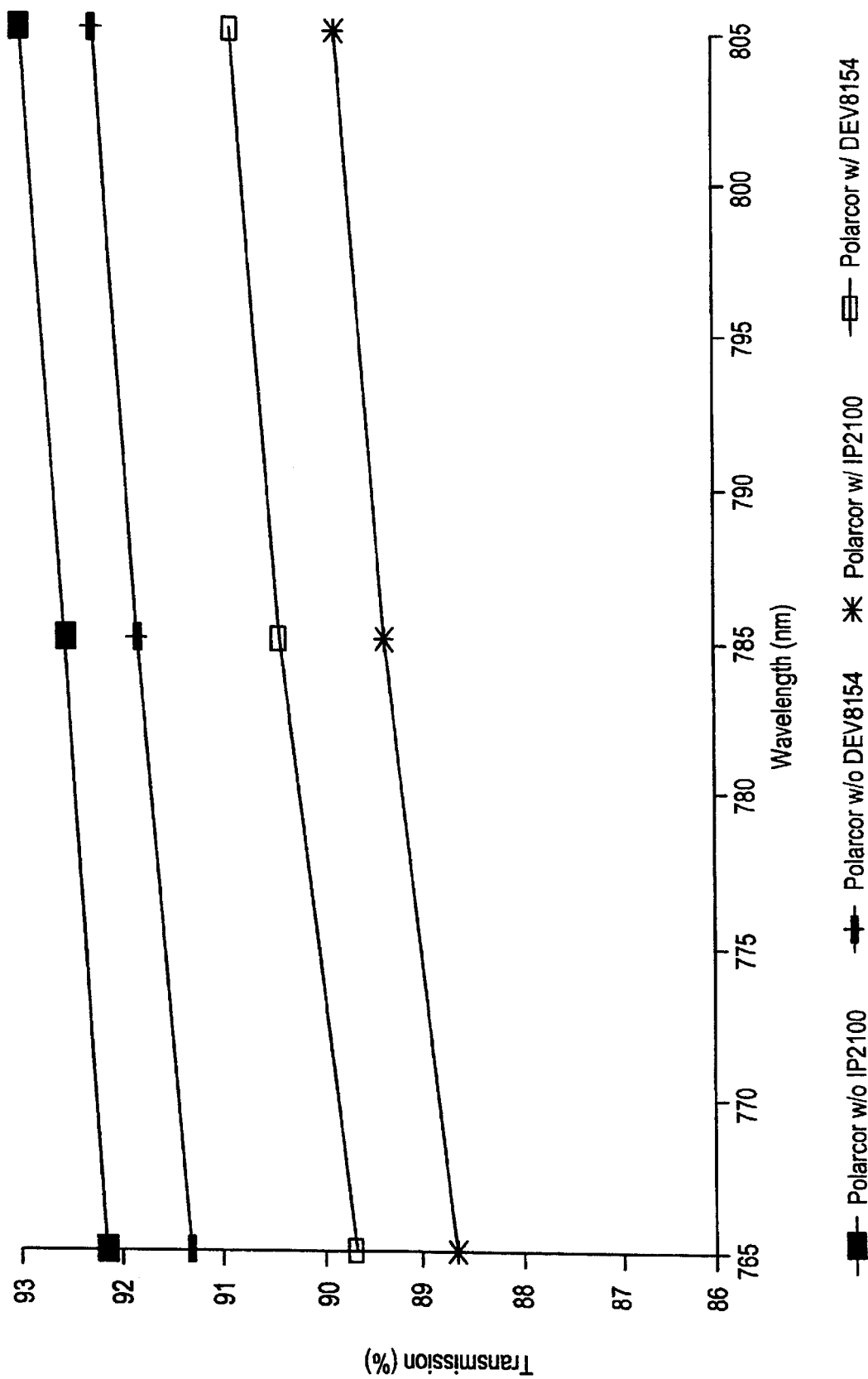
FIG. 2 shows the results of light transmission tests carried out with various adhesives before durability tests.

Diced parts produced as set forth in Example 1 were subjected to durability testing. Prior to testing, the diced parts were tested for optical transmission at 765, 785, and 805 nm. See FIG. 2. The parts made with DEV1854 showed optical transmission efficiency of 89–91%. The test involved exposure of the parts to the following conditions: (1) 50° C. at 80% relative humidity for 96 hours; (2) −45° C. at 0% relative humidity for 96 hours; and (3) 70° C. at 0% relative humidity for 96 hours. The cycle was repeated ten times before determining the percent transmission at 765, 785, and 805 nm.

Figure 3:
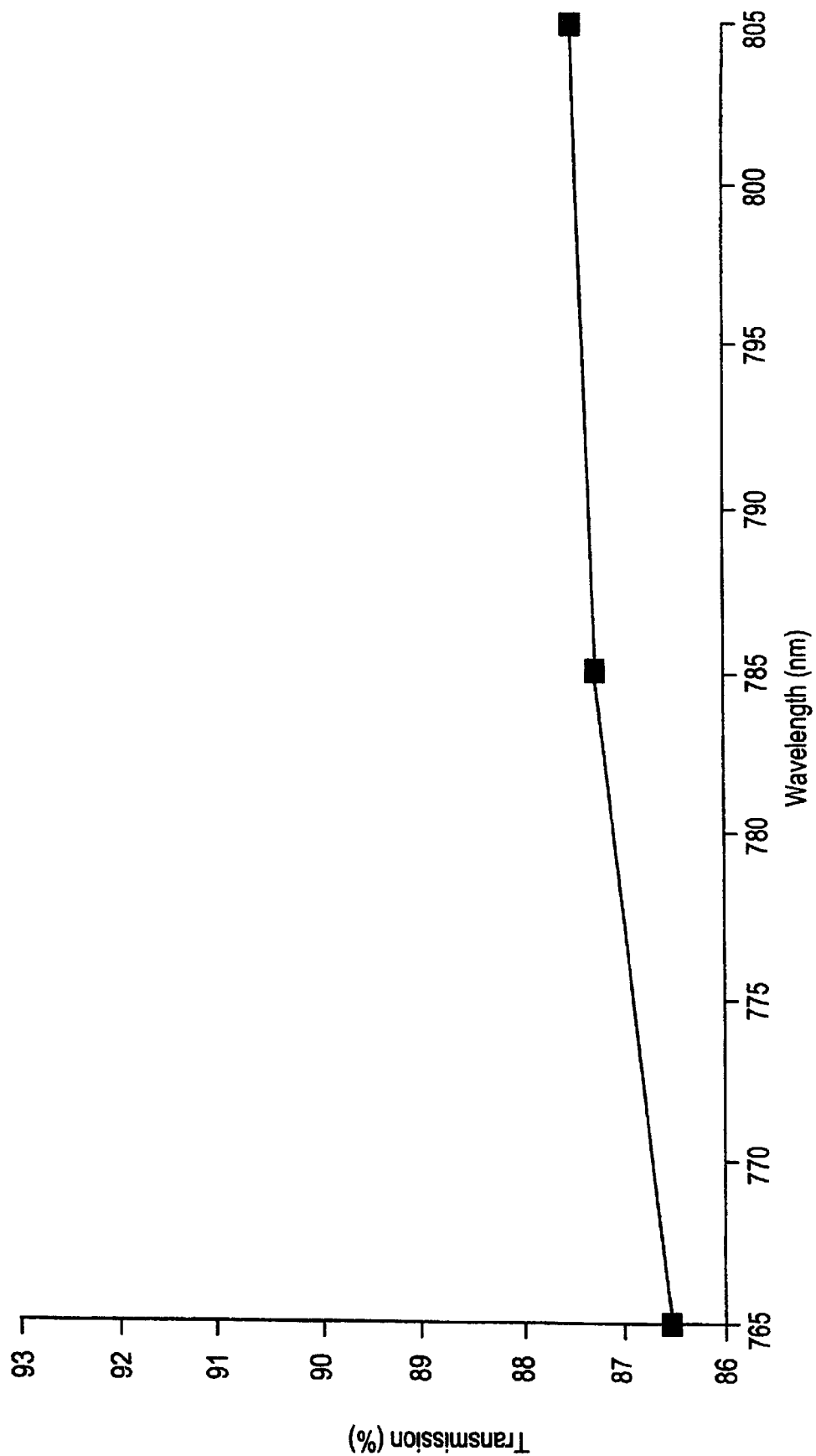
FIG. 3 shows the results of light transmission tests carried out with various adhesives after durability tests.

As shown in FIG. 3, DEV-8154 showed little deterioration of optical transmission upon the completion of the test. Optical transmission remained at a level of 86–87% over the entire range.

Although preferred embodiments have been depicted and described in detail herein, it will be apparent to those skilled in the relevant art that various modifications, additions, substitutions, and the like can be made without departing from the spirit of the invention and these therefore are considered within the scope of the invention as defined in the claims which follow.

What is claimed:

1. A method of forming an optical element comprising the following steps:
providing a pressure sensitive adhesive sheet which is optically transmissive and has a first and second release liner on opposing first and second side of the adhesive sheet;
removing the release liner from the first side of the pressure sensitive adhesive sheet;
applying the first side of the adhesive sheet to one side of an optically transmissive substrate;
dicing said optically transmissive substrate with the pressure sensitive adhesive sheet attached thereto to a desired shape;
removing the second release liner from the pressure sensitive adhesive sheet attached to said optically transmissive substrate; and
applying the second side of the pressure sensitive adhesive sheet against a compatible substrate.

2. The method of claim 1, wherein the optically transmissive substrate is a polarizer.

3. The method of claim 2, wherein the polarizer is a dichroic silver halide glass polarizer.

4. The method of claim 1, wherein the pressure sensitive adhesive when applied to the optically transmissive substrate has a thickness of 10±5 microns.

5. The method of claim 1, wherein the pressure sensitive adhesive will transmit at least 80% of light having a wavelength of 785±20 nanometers.

6. The method of claim 1, wherein the pressure sensitive adhesive is selected from the group consisting of silicon and acrylic based adhesives.

7. The method of claim 1, wherein the pressure sensitive adhesive is an acrylic based adhesive.

8. The method of claim 1, wherein said compatible substrate is formed of a synthetic resin.

9. The method of claim 8, wherein said synthetic resin is selected from a group consisting of polycarbonate, acrylic resin, polystyrene or polystyrene co-polymer, polyethersulfone, and fluoroplastics.

10. The method of claim 9, wherein said synthetic resin is polycarbonate.

11. The method of claim 9, wherein said synthetic resin is acrylic resin.

12. The method of claim 1, wherein said compatible substrate is formed of glass.

13. A method of forming an optical isolator comprising the following steps:
providing a Faraday rotator having a first end and a second end;
providing a first and a second pressure sensitive adhesive sheet, each of which is optically transmissive, has opposing first and second sides, and has a first and a second release liner on the first and second sides of the pressure sensitive adhesive sheet;
removing the first release liner from the first side of each pressure sensitive adhesive sheet;
applying the exposed first side of the first pressure sensitive adhesive sheet to a side of a first polarizer;
applying the exposed first side of the second pressure sensitive adhesive sheet to a side of a second polarizer;
dicing the first polarizer with the pressure sensitive adhesive sheet attached thereto to a desired shape;
dicing the second polarizer with the pressure sensitive adhesive sheet attached thereto to a desired shape;

removing the second release liner from the second side of each of the pressure sensitive adhesive sheets;

applying the exposed second side of the first pressure sensitive adhesive sheet of the desired shape to the first end of the Faraday rotator; and applying the exposed second side of the second pressure sensitive adhesive sheet of the desired shape to the second end of the Faraday rotator.

14. The method of claim 13, wherein said polarizers are orientated at an angle of 45 degrees relative to one another.

15. The method of claim 13, wherein the first and second polarizers are dichroic silver-halide glass polarizers.

16. The method of claim 15, wherein the first and second polarizers attached to the Faraday rotator are positioned such that they are oriented at an angle of 45 degrees relative to one another.

17. An optical element comprising:

a dichroic silver halide glass polarizer;

a release liner; and a pressure sensitive adhesive sheet which is optically transmissive and is secured to and positioned between said dichroic silver halide glass polarizer and said release liner.

18. The optical element of claim 17, wherein said pressure sensitive adhesive sheet has a thickness of 10±5 microns.

19. The optical element of claim 17, wherein said pressure sensitive adhesive sheet transmits at least 80% of light at 785±20 nanometers in wavelength.

20. The optical element of claim 17, wherein the pressure sensitive adhesive is selected from the group consisting of silicone and acrylic based adhesives.

21. The optical element of claim 20, wherein the pressure sensitive adhesive is an acrylic based adhesive.

22. An optical element comprising:

a dichroic silver halide glass polarizer;

a compatible substrate; and a pressure sensitive adhesive sheet which is optically transmissive and is secured to and positioned between said dichroic silver halide glass polarizer and said compatible substrate;

wherein said compatible substrate is formed of a synthetic resin.

23. The optical element of claim 22, wherein said synthetic resin is selected from a group consisting of polycarbonate, acrylic resin, polystyrene or polystyrene co-polymer, polyethersulfone, and fluoroplastics.

24. The optical element of claim 23, wherein said synthetic resin is polycarbonate.

25. The optical element of claim 23, wherein said synthetic resin is acrylic resin.

* * * * *